United States Patent
Cabrita Condessa et al.

(10) Patent No.: US 11,651,220 B2
(45) Date of Patent: May 16, 2023

(54) ASYMMETRICAL ROBUSTNESS FOR CLASSIFICATION IN ADVERSARIAL ENVIRONMENTS

(71) Applicant: Robert Bosch GmbH, Stuttgart (DE)

(72) Inventors: Filipe J. Cabrita Condessa, Pittsburgh, PA (US); Jeremy Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 16/724,079

(22) Filed: Dec. 20, 2019

(65) Prior Publication Data

US 2021/0192386 A1  Jun. 24, 2021

(51) Int. Cl.
| | |
|---|---|
| *G06N 20/00* | (2019.01) |
| *G06F 18/214* | (2023.01) |
| *G06F 18/2431* | (2023.01) |
| *G06V 10/82* | (2022.01) |
| *G06V 30/19* | (2022.01) |

(52) U.S. Cl.
CPC ........... *G06N 20/00* (2019.01); *G06F 18/214* (2023.01); *G06F 18/2431* (2023.01); *G06V 10/82* (2022.01); *G06V 30/19173* (2022.01)

(58) Field of Classification Search
CPC ...... G06V 10/82; G06V 40/50; G06V 40/172; G06V 30/19173; G06V 30/194; G06K 9/6262; G06K 9/6267; G06F 21/32; G06N 20/00; G06N 3/088; G06N 3/0445; G06N 3/084; G06N 3/0454; G06N 7/005; G06T 7/0012; G06T 7/11
See application file for complete search history.

(56) References Cited

U.S. PATENT DOCUMENTS

| | | |
|---|---|---|
| 2018/0005136 A1 | 1/2018 | Gai et al. |
| 2018/0225823 A1* | 8/2018 | Zhou ................ G06V 30/19173 |
| 2020/0134383 A1* | 4/2020 | Rhee ..................... G06V 10/82 |

OTHER PUBLICATIONS

Raghunathan et al., "Certified Defenses Against Adversarial Examples", Department of Computer Science, Stanford University, Jan. 29, 2018, 15 pages.
Gowal et al., "On the Effectiveness of Interval Bound Propagation for Training Verifiably Robust Models", Aug. 29, 2019, 16 pages.

* cited by examiner

*Primary Examiner* — Kyung H Shin
(74) *Attorney, Agent, or Firm* — Brooks Kushman P.C.

(57) ABSTRACT

A computational method for training a classifier. The method includes receiving a training data set comprised of pairs of training input and output signals, the classifier parameterized by parameters, a class-dependent allowed perturbation for each of at least two different classes and including a first class-dependent allowed perturbation for a first class and a second class-dependent allowed perturbation for a second class, and a loss function. The method further includes partitioning the training data set into a first subset labelled with a first label and a second subset labelled with a second label. The method also includes calculating a first loss in response to the first subset and the first class-dependent allowed perturbation and a second loss calculated in response to the second subset and the second class-dependent allowed perturbation. The method also includes updating the parameters in response to the first and second losses to obtain updated parameters.

20 Claims, 5 Drawing Sheets

ASYMMETRICAL ROBUSTNESS FOR CLASSIFICATION IN ADVERSARIAL ENVIRONMENTS

TECHNICAL FIELD

The present disclosure relates to computational methods and computer systems for providing asymmetrical robustness for classification in adversarial environments, including computational methods and computer systems for training a classifier (e.g. machine learning (ML) algorithm) in an adversarial environment.

BACKGROUND

Supervised machine learning (ML) algorithms (otherwise referred to as classifiers) include deep learning algorithms built upon deep neural networks. ML algorithms are susceptible to adversarial attacks on their input space. The classifier may be denoted by f that maps a feature signified by $x \in \mathbb{R}^d$ into a class $y \in \{1, \ldots, K\}$. An adversarial attack to f corresponds to an imperceptible perturbation $\delta$ that, when added to an input x, classifier f outputs a different result, i.e. $f(x) \neq f(x+\delta)$. Imperceptibility is often modeled as a membership to a set of allowed perturbations $\delta \in \Delta$ either by constraining an $\ell_p$-norm of the perturbation $\delta$ or by forcing perceptual imperceptibility of the change, for example, by increasing the difficulty of an operator to distinguish unperturbed data x from perturbed data $x+\delta$. The susceptibility of classifiers to adversarial attacks, either arising from a malign agent or from noise sources, raises concerns to their use in critical tasks. For instance, minor imperceptible changes on the input may cause drastic changes on the output and behavior of the classifier f.

SUMMARY

According to one embodiment, a computational method for training a classifier is disclosed. The method includes receiving a training data set comprised of pairs of training input signals and corresponding output signals. The classifier is parameterized by parameters and configured to classify input signals obtained from a sensor into at least two different classes including first and second classes. The method further includes receiving a class-dependent allowed perturbation for each of the at least two different classes and including a first class-dependent allowed perturbation for the first class and a second class-dependent allowed perturbation for the second class. The method further includes receiving a loss function. The computational method also includes partitioning the training data set into a first subset labelled with a first label corresponding to the first class and a second subset labelled with a second label corresponding to the second class. The computational method also includes calculating a first loss in response to the first subset and the first class-dependent allowed perturbation and a second loss calculated in response to the second subset and the second class-dependent allowed perturbation. The computational method also includes updating the parameters in response to the first and second losses to obtain updated parameters.

In a second embodiment, a non-transitory computer-readable medium comprising computer-executable instructions and a memory for maintaining the computer-executable instructions is disclosed. The computer-executable instructions when executed by a processor of a computer perform functions, including receiving a training data set comprised of pairs of training input signals and corresponding output signals. The classifier is parameterized by parameters and configured to classify input signals obtained from a sensor into at least two different classes including first and second classes. The functions further include receiving a class-dependent allowed perturbation for each of the at least two different classes and including a first class-dependent allowed perturbation for the first class and a second class-dependent allowed perturbation for the second class. The functions further include receiving a loss function. The functions further include partitioning the training data set into a first subset labelled with a first label corresponding to the first class and a second subset labelled with a second label corresponding to the second class. The functions also include calculating a first loss in response to the first subset and the first class-dependent allowed perturbation and a second loss calculated in response to the second subset and the second class-dependent allowed perturbation. The functions also include updating the parameters in response to the first and second losses to obtain updated parameters.

In another embodiment, a computer system including a computer having a processor for executing computer-executable instructions and a memory for maintaining the computer-executable instructions is disclosed. The computer-executable instructions when executed by the processor of the computer perform functions. The functions include receiving a training data set comprised of pairs of training input signals and corresponding output signals. The classifier is parameterized by parameters and configured to classify input signals obtained from a sensor into at least two different classes including first and second classes. The functions further include receiving a class-dependent allowed perturbation for each of the at least two different classes and including a first class-dependent allowed perturbation for the first class and a second class-dependent allowed perturbation for the second class. The functions further include receiving a loss function. The functions also include partitioning the training data set into a first subset labelled with a first label corresponding to the first class and a second subset labelled with a second label corresponding to the second class. The functions also include calculating a first loss in response to the first subset and the first class-dependent allowed perturbation and a second loss calculated in response to the second subset and the second class-dependent allowed perturbation. The functions also include updating the parameters in response to the first and second losses to obtain updated parameters.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
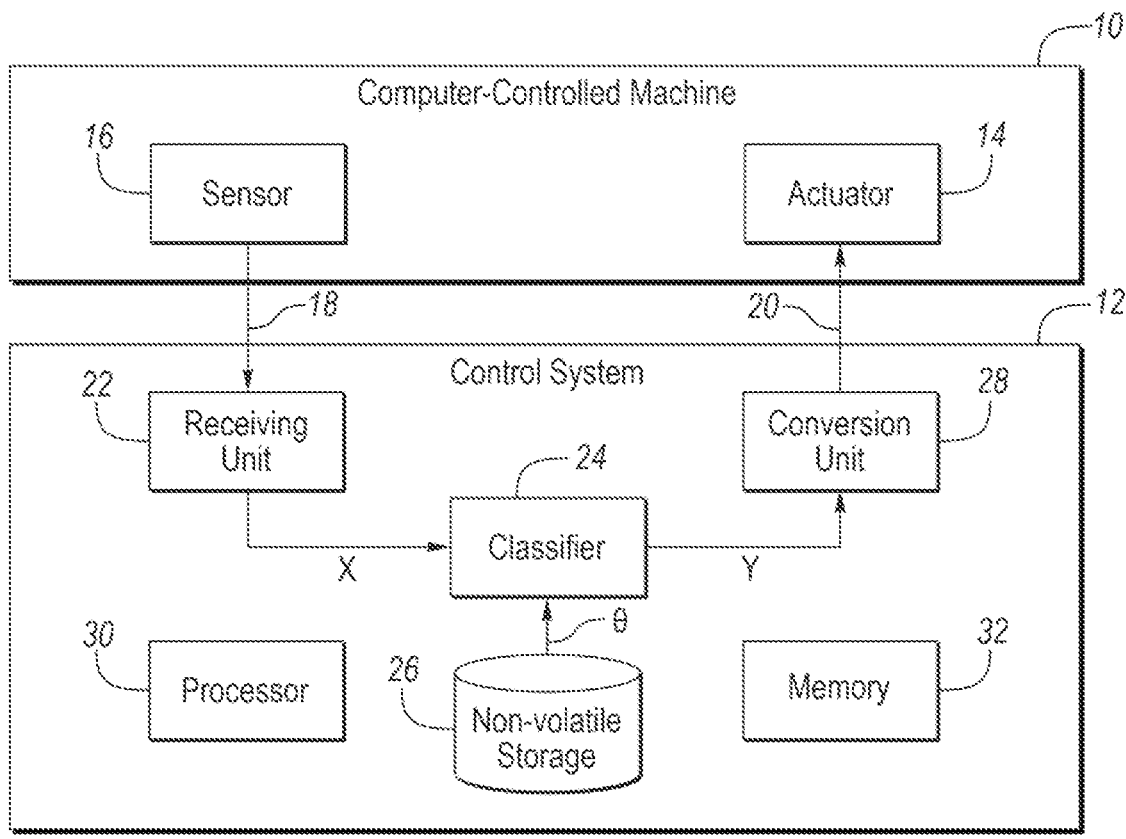
FIG. 1 depicts a schematic diagram of an interaction between a computer-controlled machine and a control system according to one embodiment.

FIG. 1 depicts a schematic diagram of an interaction between computer-controlled machine 10 and control system 12. Computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 1, control system 12 includes receiving unit 22. Receiving unit 22 may be configured to receive sensor signals 18 from sensor 30 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to produce each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network. Classifier 24 is configured to be parametrized by parameters θ. Parameters θ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 10.

As shown in FIG. 1, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 2:
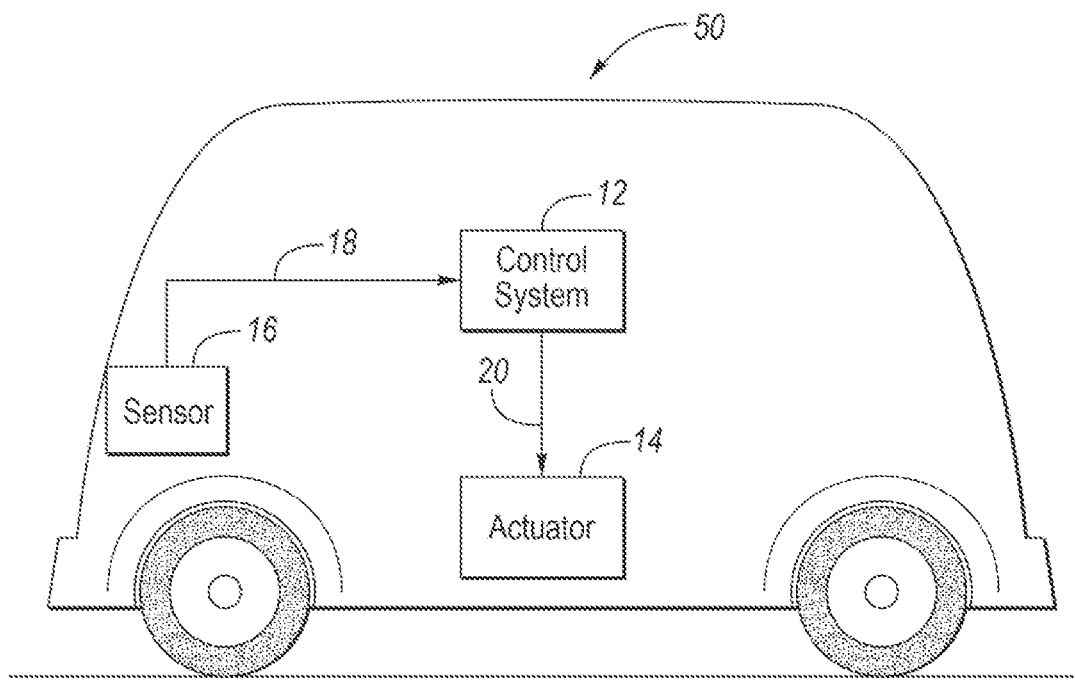
FIG. 2 depicts a schematic diagram of the control system of FIG. 1 configured to control a vehicle, which may be a partially autonomous vehicle or a partially autonomous robot.

FIG. 2 depicts a schematic diagram of control system 12 configured to control vehicle 50, which may be an at least partially autonomous vehicle or an at least partially autonomous robot. As shown in FIG. 2, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 3:
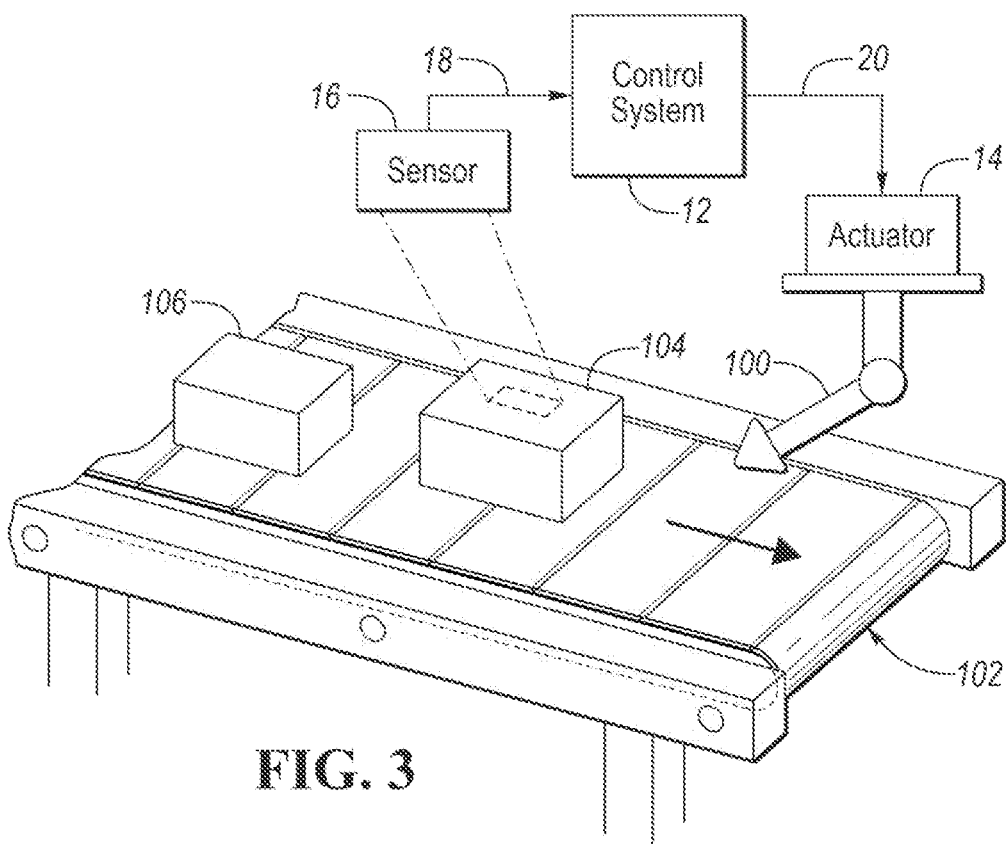
FIG. 3 depicts a schematic diagram of the control system of FIG. 1 configured to control a manufacturing machine, such as a punch cutter, a cutter or a gun drill, of manufacturing system, such as part of a production line.

FIG. 3 depicts a schematic diagram of control system 12 configured to control manufacturing machine 100, such as a punch cutter, a cutter or a gun drill, of manufacturing system 102, such as part of a production line. Control system 12 may be configured to control actuator 14, which is configured to control manufacturing machine 100.

Sensor 16 of manufacturing machine 100 may be an optical sensor configured to capture one or more properties of manufactured product 104. Classifier 24 may be configured to determine a state of manufactured product 104 from one or more of the captured properties. Actuator 14 may be configured to control manufacturing machine 100 depending on the determined state of manufactured product 104 for a subsequent manufacturing step of manufactured product 104. The actuator 14 may be configured to control functions of manufacturing machine 100 on subsequent manufactured product 106 of manufacturing machine 100 depending on the determined state of manufactured product 104.

Figure 4:
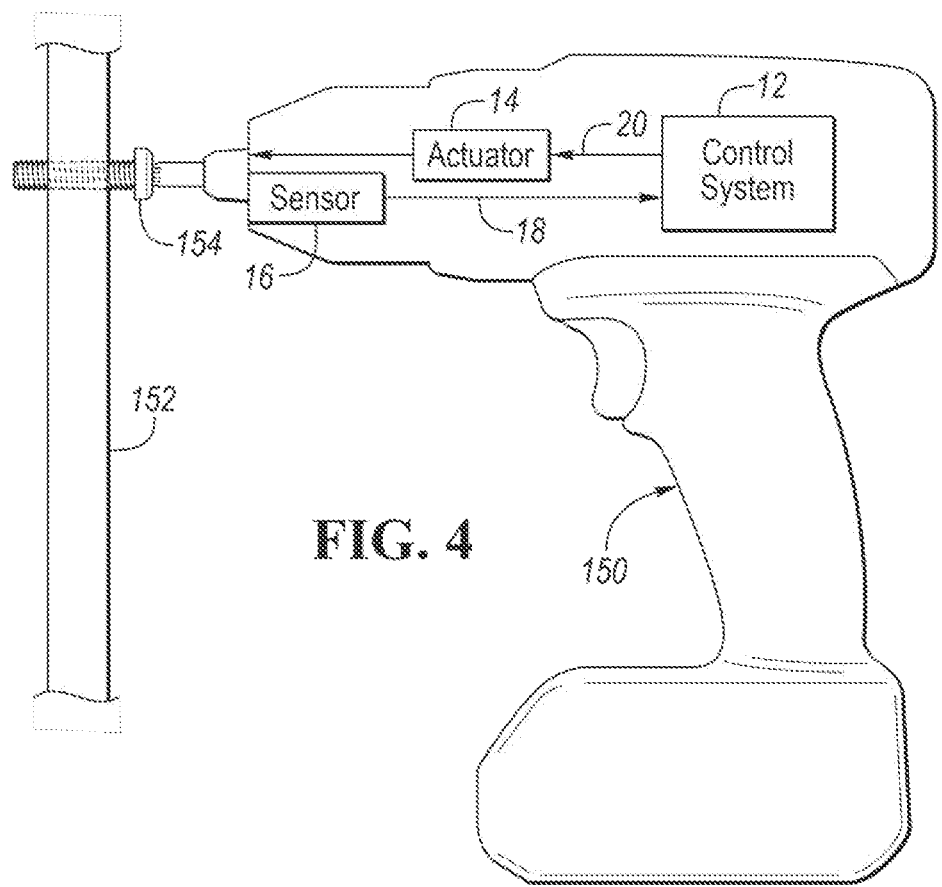
FIG. 4 depicts a schematic diagram of the control system of FIG. 1 configured to control a power tool, such as a power drill or driver, that has an at least partially autonomous mode.

FIG. 4 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 154. Actuator 14 may be configured to control power tool 150 such that the driving function of power tool 150 is adjusted depending on the determined state of fastener 154 relative to work surface 152 or one or more captured properties of work surface 154. For example, actuator 14 may discontinue the driving function if the state of fastener 154 is flush relative to work surface 152. As another non-limiting example, actuator 14 may apply additional or less torque depending on the hardness of work surface 152.

Figure 5:
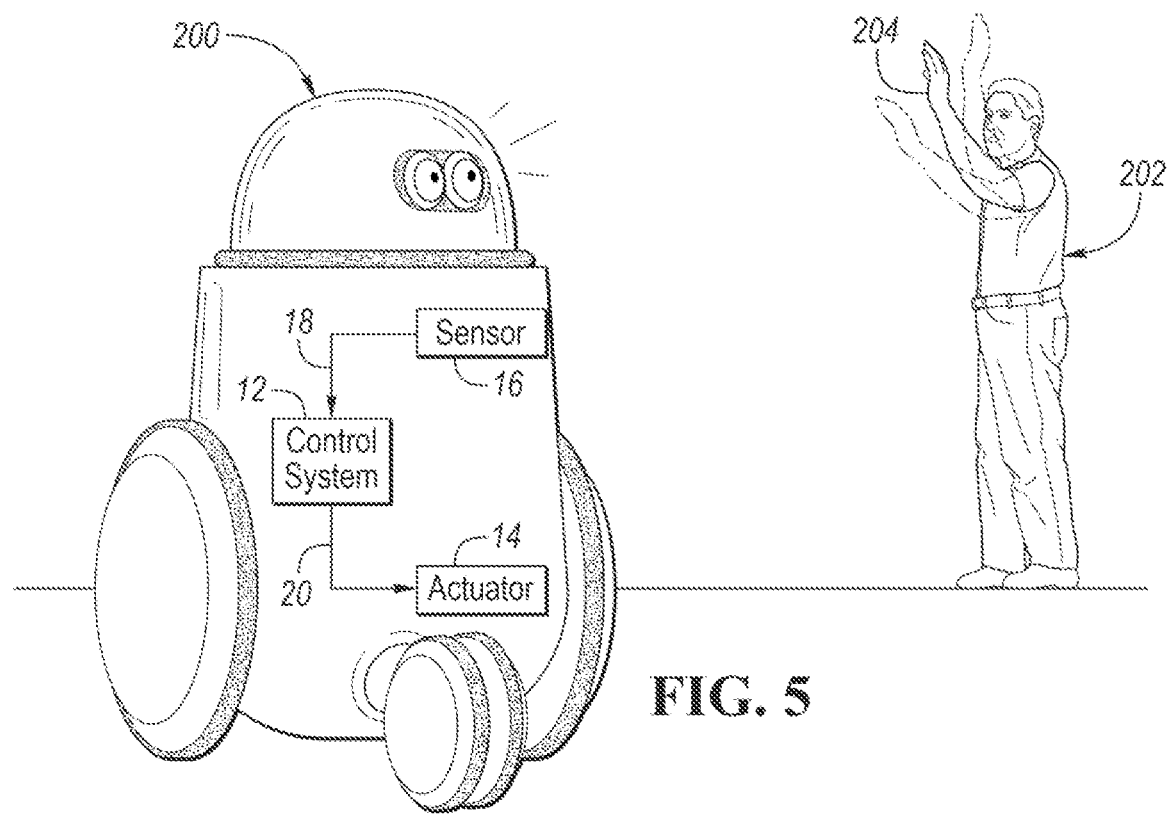
FIG. 5 depicts a schematic diagram of the control system of FIG. 1 configured to control an automated personal assistant.

FIG. 5 depicts a schematic diagram of control system 12 configured to control automated personal assistant 200. Control system 12 may be configured to control actuator 14, which is configured to control automated personal assistant 200. Automated personal assistant 200 may be configured to control a domestic appliance, such as a washing machine, a stove, an oven, a microwave or a dishwasher.

Sensor 16 may be an optical sensor and/or an audio sensor. The optical sensor may be configured to receive video images of gestures 204 of user 202. The audio sensor may be configured to receive a voice command of user 202.

Control system 12 of automated personal assistant 200 may be configured to determine actuator control commands 20 configured to control system 12. Control system 12 may be configured to determine actuator control commands 20 in accordance with sensor signals 18 of sensor 16. Automated personal assistant 200 is configured to transmit sensor signals 18 to control system 12. Classifier 24 of control system 12 may be configured to execute a gesture recognition algorithm to identify gesture 204 made by user 202, to determine actuator control commands 20, and to transmit the actuator control commands 20 to actuator 14. Classifier 24 may be configured to retrieve information from non-volatile storage in response to gesture 204 and to output the retrieved information in a form suitable for reception by user 202.

Figure 6:
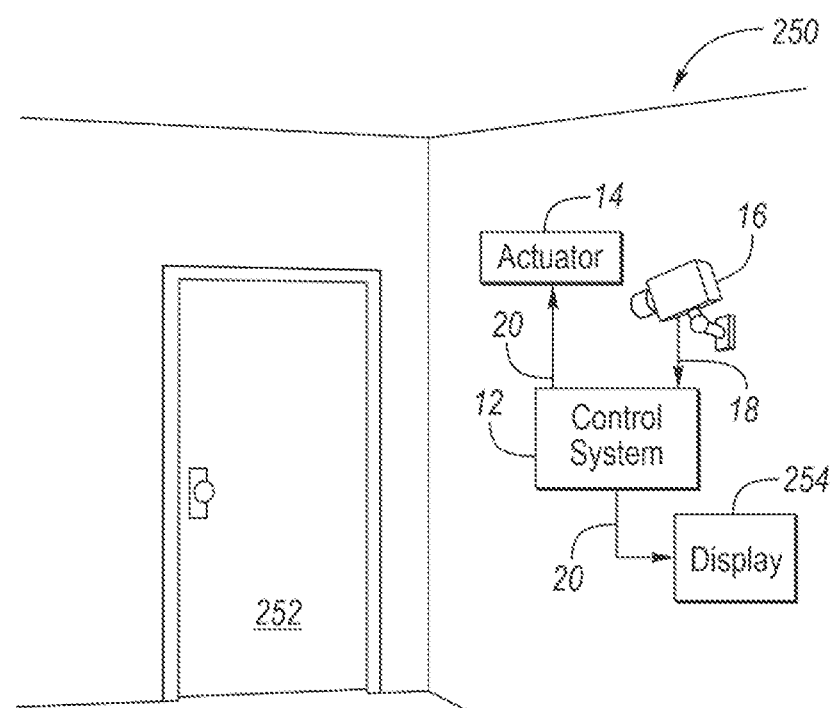
FIG. 6 depicts a schematic diagram of the control system of FIG. 1 configured to control a monitoring system, such as a control access system or a surveillance system.

FIG. 6 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 12 may be configured to generate and an actuator control command 20 in response to the interpretation of the image and/or video data. Control system 12 is configured to transmit the actuator control command 20 to actuator 12. In this embodiment, actuator 12 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 7:
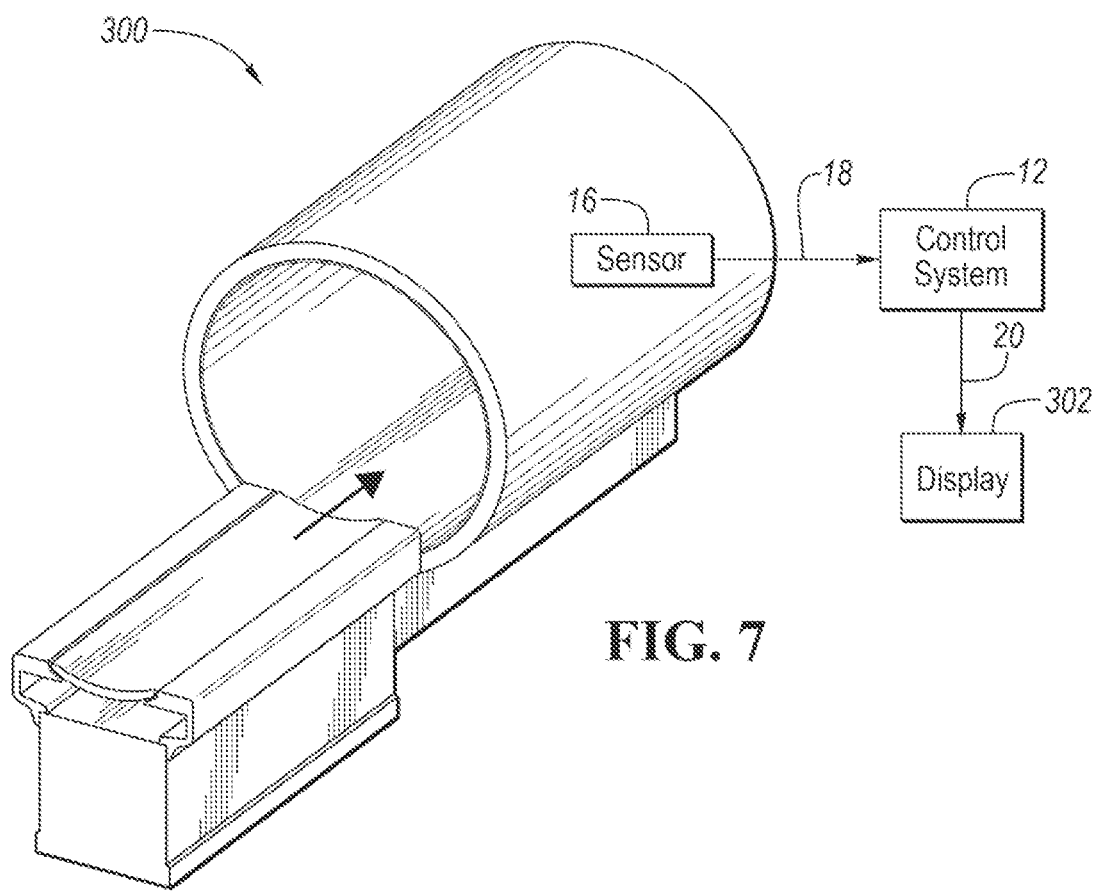
FIG. 7 depicts a schematic diagram of the control system of FIG. 1 configured to control an imaging system, for example an MRI apparatus, x-ray imaging apparatus or ultrasonic apparatus.

FIG. 7 depicts a schematic diagram of control system 12 configured to control imaging system 300, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification. For example, classifier 24 may interpret a region of a sensed image to be potentially anomalous. In this case, actuator control command 20 may be determined or selected to cause display 302 to display the imaging and highlighting the potentially anomalous region.

A classifier may be subject to adversarial attacks that may cause drastic changes to the output and behavior of the classifier. Defenses exist against adversarial attacks in supervised classification scenarios and empirical defenses (adversarial training) against adversarial examples. These defenses operate in a class-agnostic fashion.

Under one proposal, to reduce this problem, a robust classifier may be trained where, at the cost of unperturbed performance, the classifier exhibits a degree of robustness to changes on the input. In such a scenario, a loss function may be optimized against a worst-case scenario by optimizing the loss function on the worst possible perturbation (or approximation thereof) applied to each sample. Accordingly, the classifier may be robustly trained by $$\theta_{ROB} = \underset{\theta}{\arg\min} \mathbb{E}_{x \in X} \left[ \underset{\delta \in \Delta}{\max} L(\theta, x) \right] \quad (1)$$

where $\theta_{ROB}$ denotes a robust parametrization of the classifier f, $\theta$ denotes a parameterization of the classifier f such that a robust loss $$\underset{\delta \in \Delta}{\max} L(\theta, x)$$

is minimized with respect to $\theta$, X denotes a training set, and $\delta$ is a family of allowed perturbations, e.g. $\Delta = \{\delta: \|\delta\|_p \leq \epsilon\}$.

The robust training procedure P can approximate the robust loss by finding an adversarial example $\delta \in \Delta$ and optimizing for x+$\delta$, by upper-bounding the loss in x+$\delta$, for any $\delta \in \Delta$, finding an exact value of the robust version of the loss, or any other approximation (lower or upper bound) of it. The resulting robust classifier presents a benefit of an increased degree of robustness with regards to perturbations at test time, across all classes, but at the cost of lower classification performance at test time, across all classes.

This robustness is symmetrical by design. The classifier trades performance across all K classes as Δ is the same for all classes. This poses a significant problem in situations where uneven consequences of misclassification. By increasing robustness to perturbations regarding one class, the classifier is also robust to perturbations across all other classes. In a specific example of failure detection, robustness to perturbations on non-failures can cause the classifier to misclassify failures as non-failures, with potentially drastic consequences. On the other hand, small perturbations on failures are still failures. Hence, the classifier should be robust to perturbations on failures. Accordingly, there is a need for computational methods to asymmetrically provide robustness to classifiers and computer systems to asymmetrically provide robustness to classifiers.

In one or more embodiments, computational methods and computer systems are presented that asymmetrically train robust classifiers, given a classifier f that maps a feature $x \in \mathbb{R}^d$ into a class $y \in \{1, \ldots, K\}$, and a set of class dependent sets of allowed perturbations $\{\Delta_1, \ldots, \Delta_k\}$. In one or more embodiments, the associated robust loss is extended into a sum of K separate robust losses, each with a separate set of allowed perturbation. Robust training procedures (either empirical or provable) may be applied to the expanded robust loss.

A classifier may be trained from labeled data to create an asymmetrically robust classifier. The classifier may be trained across training data originating across different classes, e.g., first and second different classes. In one or more embodiments, the adversarial examples or worst-case scenario perturbations are class-dependent. Accordingly, different classes may have different sets of allowable perturbations. One or more embodiments have the benefit of addressing classification problems with asymmetrically robust classification systems where misclassification risks and the consequences of these risks are asymmetric, the attacker or acquisition process has class-dependent characteristics, or the classification performance versus robustness trade-off is not class-agnostic (e.g. automated optical inspection, failure identification, mission-critical classification systems, etc.)

Figure 8:
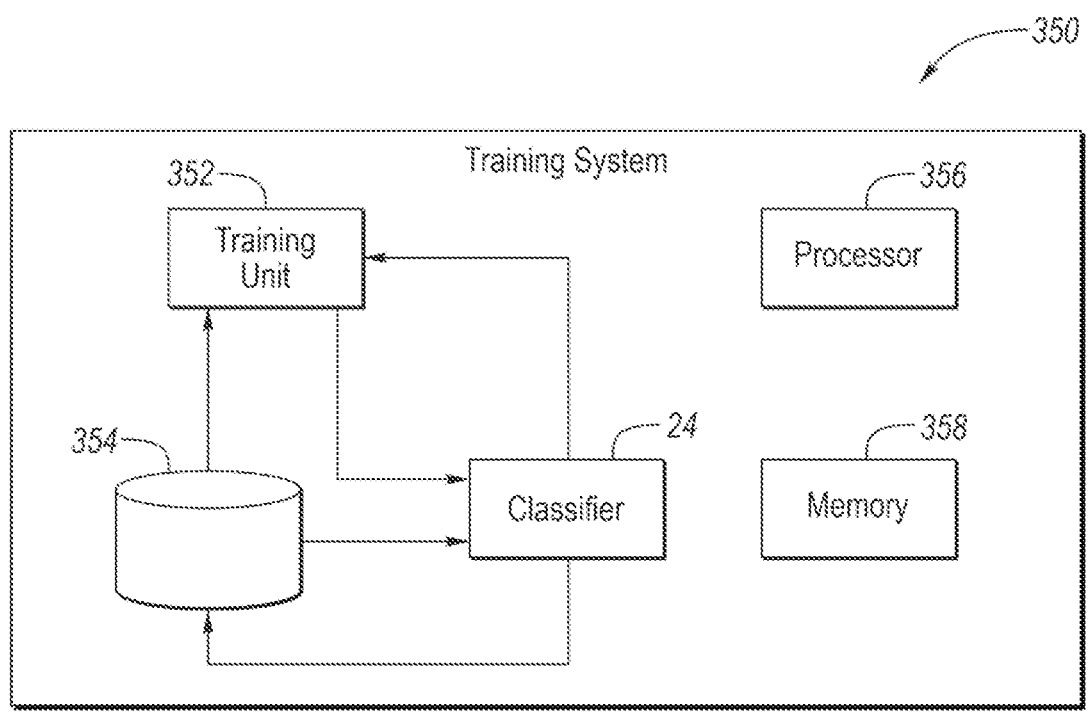
FIG. 8 depicts a schematic diagram of a training system for training a classifier according to one or more embodiments.

FIG. 8 depicts a schematic diagram of training system 350 for training classifier 24 according to one or more embodiments. Training unit 352 is configured to determine input signals x and to transmit input signals x to classifier 24. In one embodiment, training unit 352 is configured to access non-volatile storage 354 to obtain a set of training data $X=\{(x_1, y_1), \ldots, (x_n, y_n)\}$ stored thereon. Non-volatile storage 354 also stores a loss function L. Non-volatile storage 354 may also store a set of class-dependent allowed perturbations $\mathcal{D} = \Delta_1, \ldots, \Delta_K$. Furthermore, training system 350 may include processor 356 and memory 358. Processor 356 may include one or more processors. Memory 358 may include one or more memory devices. The ML algorithms of one or more embodiments may be implemented by training system 350, which includes non-volatile storage 354, processor 356 and memory 358.

Training system 350 is configured to execute a robust training procedure P to find a solution or approximate solution to learn classifier f parameterized by θ such that a robust loss is minimized with respect to θ. The robust training procedure P may be an asymmetrical robust classifier configured to be trained by training system 350 by expanding a robust loss function to be class separable. This training results in K different robust loss functions computed over a partition of the training sets across K different classes. The final classifier parameters may be obtained by solving for the sum of the K different loss functions across the partition of the training sets.

Figure 9:
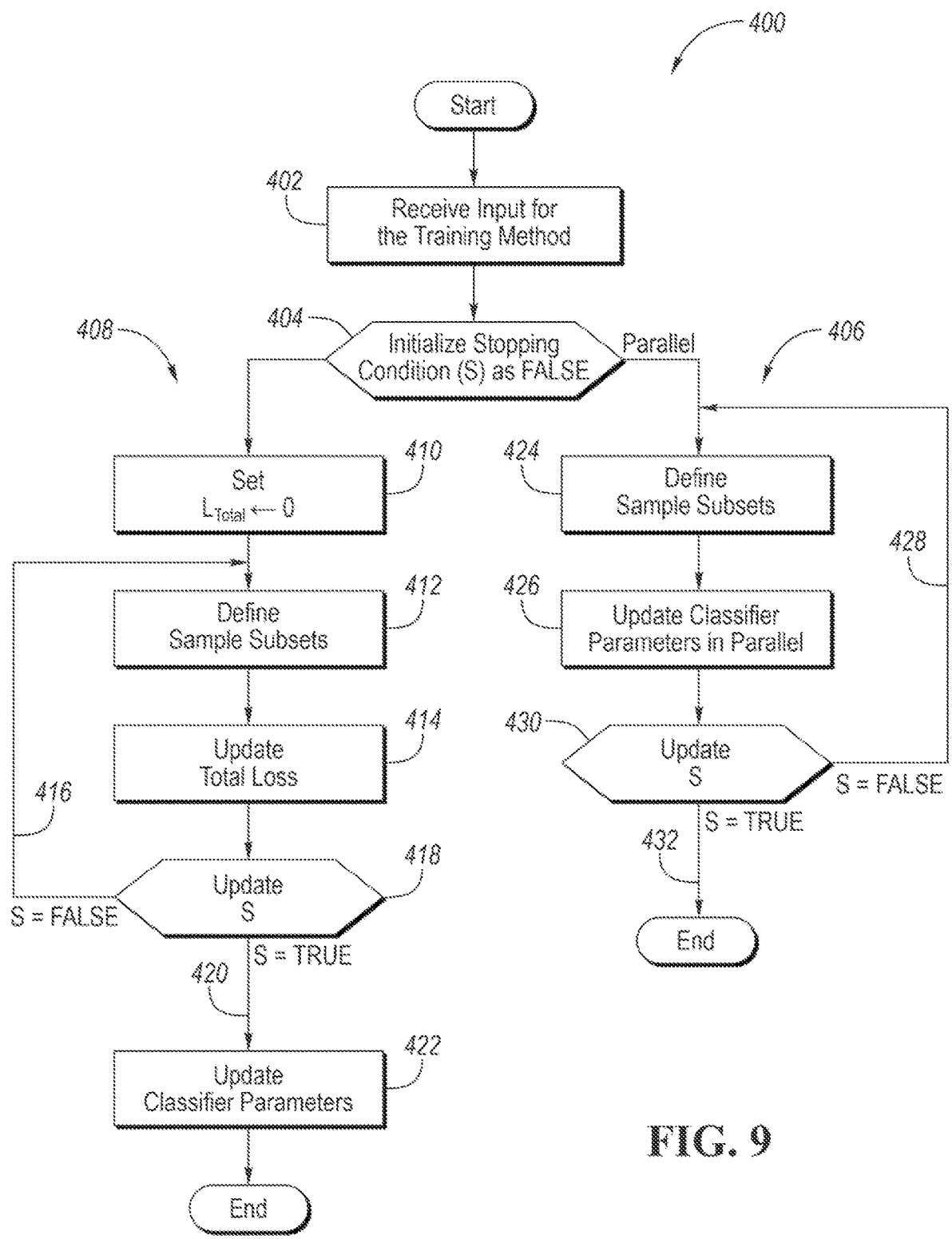
FIG. 9 depicts a flow chart of a computational method for training a classifier according to one or more embodiments.

FIG. 9 depicts flow chart 400 of a computational method for training classifier 24 according to one embodiment. The computational method may be carried out and implemented using training system 350. The computational method for training classifier 24 may be signified by a robust training procedure P.

In step 402, input is received for the training method. In one embodiment, the input includes training data set comprised of pairs of training input signals and corresponding output signals. The training data set may be represented by the following equation:

$$X=\{(x_1,y_1), \ldots ,(x_n,y_n)\} \qquad (2)$$

In this embodiment, the input further includes classifier 24, which may be represented by f, parameterized by parameters, which may be signified by θ. Classifier 24 may be configured to classify input signals obtaining from one or more of the sensors disclosed herein into at least two different classes. In this embodiment, the input may further include a stopping condition S, e.g. a binary stopping condition. The binary stopping condition S may be initialized to a pre-determined starting value, such as FALSE. The input further includes a class-dependent allowed perturbation for each of the at least two different classes that may be represented by the following equation:

$$\mathcal{D} = \Delta_1, \ldots ,\Delta_K \qquad (3)$$

where $\Delta_1$ is a class-dependent allowed perturbation for a first class and $\Delta_K$ is a class-dependent allowed perturbation for a Kth class. The class-dependent allowed perturbation may be different for each of the at least two different classes. The input may further include a loss function, which may be signified by L. The loss function L may be configured to optimize the parameters θ of classifier 24 of an ML algorithm.

In step 404, a stopping condition S may be initialized. The stopping condition S may be a binary stopping condition. The stopping condition S may be initialized as FALSE. In certain embodiments, classifier 24 may be a parallelizable robust training procedure L. In such embodiments, classifier 24 may be trained using parallel training steps identified in branch 406 of training system 350 represented in flow chart 400. In other embodiments, classifier 24 may not be capable of parallelization. In such other embodiment, classifier 24 may be trained using training steps identified in branch 408 of training system 350 represented in flow chart 400.

In step 410 of branch 408, the total loss $L_{Total}$ of the total loss function L is initialized to tend toward 0 (i.e. $L_{Total} \leftarrow 0$). In one or more embodiments, steps 412 and 414 are iteratively performed within class loop 416 for i in 1, ..., K (where i is a label for each of the classes K) when a stopping condition is a certain value or range of values.

In step 412, sample subsets are defined to partition the training data set into different subsets with different labels. The training data set may be partitioned into a first subset labelled with a first label corresponding to a first class and a second subset labelled with a second label corresponding to a second class. For each label i for each of the classes K, subset $X_i \subset X$ may be defined such that $X_i$ contains all the samples with label i.

In step 414, the total loss $L_{Total}$ may be updated in response to the subsets $X_i \subset X$ for each label i. The total loss may be updated to include a robust loss on the ith class according to the respective set of allowed perturbations for the ith class. The updating of the total loss in this manner may be represented by the following equation.

$$L_{Total} \leftarrow L_{Total} + \mathbb{E}_{x \in X_i} \left[ \max_{\delta \in \Delta_i} L(\theta, x) \right] \quad (4)$$

where $L_{Total}$ denotes a total loss, $X_i$ is a training set for the ith class, and Ai is an allowed perturbation for the ith class.

In step 418, the stopping condition S is updated in response to the updated total loss. The stopping condition S may be updated using stopping rules to determine when to stop training classifier 24. The stopping condition S is updated to FALSE in response to the number of stopping rules determining a continuation of training of classifier 24. The stopping condition S is updated to TRUE in response to the number of stopping rules determining a discontinuation of training of classifier 24. As shown by loop 416, branch 408 continues to execute steps 412 and 414 while the stopping condition S is FALSE. As shown by arrow 420, branch 408 discontinues execution of steps 412 and 414 once step 418 sets the stopping condition S to TRUE.

In step 422, the classifier parameters are updated by applying the training method (e.g. robust training procedure P) to an optimization problem. In one embodiment, the optimization problem may be represented by the following equation.

$$\theta_{ROB} \leftarrow \arg\min_{\theta} L_{Total} = \arg\min_{\theta} \sum_{i=1}^{K} \mathbb{E}_{x \in X_i} \left[ \max_{\delta \in \Delta_i} L(\theta, x) \right] \quad (5)$$

where $\theta_{ROB}$ are robust classifier parameters.

As stated above, classifier 24 may be trained using parallel training steps identified in branch 406 when classifier 24 is capable of being parallelizable. In one or more embodiments, steps 424 and 426 are iteratively performed within class loop 428 for i in 1, . . . , K (where i is a label for each of the classes K) when a stopping condition is a certain value or range of values.

In step 424, sample subsets are defined to partition the training data set into different subsets with different labels. The training data set may be partitioned into a first subset labelled with a first label corresponding to a first class and a second subset labelled with a second label corresponding to a second class. For each label i for each of the classes K, subset $X_i \subset X$ may be defined such that $X_i$ contains all the samples with label i.

In step 426, the classifier parameters are updated in parallel by applying the training method (e.g. robust training procedure P) to an optimization problem. In one embodiment, the optimization problem may be represented by the following equation.

$$\theta_{ROB} \leftarrow \arg\min_{\theta} \mathbb{E}_{x \in X_i} \left[ \max_{\delta \in \Delta} L(\theta, x) \right] \quad (6)$$

where $\theta_{ROB}$ are robust parameters.

In step 430, the stopping condition S is updated in response to the updated classifier parameters determined in step 422. The stopping condition S may be updated using stopping rules to determine when to stop training classifier 24. The stopping condition S is updated to FALSE in response to the number of stopping rules determining a continuation of training of classifier 26. The stopping condition S is updated to TRUE in response to the number of stopping rules determining a discontinuation of training of classifier 24. As shown by loop 428, branch 406 continues to execute steps 424 and 426 while the stopping condition S is FALSE. As shown by arrow 432, branch 406 discontinues execution of steps 424 and 426 once step 430 sets the stopping condition S to TRUE.

In one embodiment, the set of allowed perturbations $\Delta$ may be described from a perceptual point of view. The perturbations $\Delta$ may equal $\{\delta: D(x)=D(x+\delta)\}$, where D is a discriminator configured to identify whether the input signals x is unperturbed (0) or perturbed (1), thereby making perturbations $\Delta$ a set on which the discriminator D is unable to distinguish perturbed data from unperturbed data. The discriminator D may be automatic or manual.

In other embodiments, the asymmetrical robustness of the training process may be applied to a generative model instead of a classifier, where the generative model variability of robustness to changes on input is associated to the existence of class labels to the input. In certain embodiments, the generative model may be a conditional generative model.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computational method for training a classifier, the method comprising:
receiving a training data set comprised of pairs of training input signals and corresponding output signals, the classifier parameterized by parameters and configured to classify input signals obtained from a sensor into at least two different classes including first and second classes, a class-dependent allowed perturbation for each of the at least two different classes and including a first class-dependent allowed perturbation for the first class and a second class-dependent allowed perturbation for the second class, and a loss function;
initializing a total loss and a stopping condition;

partitioning the training data set into a first subset labelled with a first label corresponding to the first class and a second subset labelled with a second label corresponding to the second class;

calculating a first loss in response to the first subset and the first class-dependent allowed perturbation and a second loss calculated in response to the second subset and the second class-dependent allowed perturbation;

updating the total loss in response to the first and second losses to obtain an updated total loss;

updating the stopping condition in response to the updated total loss to obtain an updated stopping condition;

iteratively performing the partitioning, calculating, updating the total loss, and updating the stopping condition steps within a class loop until the updated stopping condition is a stopping value different than a pre-determined value; and updating the parameters in response to the first and second losses to obtain updated parameters after the iteratively performing steps.

2. The computational method of claim 1, further comprising:

sending the input signals obtained from the sensor into the classifier parameterized by the updated parameters to obtain output signals configured to characterize a classification of the input signals; and transmitting an actuator control command to an actuator of a computer-controlled machine in response to the output signals.

3. The computational method of claim 1, wherein the updating step is carried out by a machine learning (ML) algorithm.

4. The computational method of claim 1, wherein the pre-determined value is one of first and second binary values.

5. The computational method of claim 4, wherein the pre-determined value is the first binary value and the stopping value is the second binary value.

6. The computational method of claim 1, wherein the first and second class-dependent allowed perturbations are in a set on which a discriminator is unable to distinguish perturbed data from unperturbed data.

7. The computational method of claim 1, wherein the first label is different than the second label.

8. A non-transitory computer-readable medium comprising computer-executable instructions and a memory for maintaining the computer-executable instructions, the computer-executable instructions when executed by a processor of a computer perform the following functions:

receiving a training data set comprised of pairs of training input signals and corresponding output signals, the classifier parameterized by parameters and configured to classify input signals obtained from a sensor into at least two different classes including first and second classes, a class-dependent allowed perturbation for each of the at least two different classes and including a first class-dependent allowed perturbation for the first class and a second class-dependent allowed perturbation for the second class, and a loss function;

initializing a total loss and a stopping condition;

partitioning the training data set into a first subset labelled with a first label corresponding to the first class and a second subset labelled with a second label corresponding to the second class;

calculating a first loss in response to the first subset and the first class-dependent allowed perturbation and a second loss calculated in response to the second subset and the second class-dependent allowed perturbation;

updating the total loss in response to the first and second losses to obtain an updated total loss;

updating the stooping condition in response to the updated total loss to obtain an updated stopping condition;

iteratively performing the partitioning, calculating, updating the total loss, and updating the stopping condition steps within a class loop until the updated stopping condition is a stopping value different than a pre-determined value; and updating the parameters in response to the first and second losses to obtain updated parameters after the iteratively performing steps.

9. The non-transitory computer-readable medium of claim 8, wherein the computer-executable instructions when executed by the processor of the computer perform the following functions:

sending the input signals obtained from the sensor into the classifier parameterized by the updated parameters to obtain output signals configured to characterize a classification of the input signals; and transmitting an actuator control command to an actuator of a computer-controlled machine in response to the output signals.

10. The non-transitory computer-readable medium of claim 8, wherein the updating function is carried out by a machine learning (ML) algorithm.

11. The non-transitory computer-readable medium of claim 8, wherein the pre-determined value is one of first and second binary values.

12. The non-transitory computer-readable medium of claim 11, wherein the pre-determined value is the first binary value and the stopping value is the second binary value.

13. The non-transitory computer-readable medium of claim 8, wherein the first and second class-dependent allowed perturbations are dependent on a discriminator that is unable to distinguish perturbed data from unperturbed data.

14. The non-transitory computer-readable medium of claim 8, wherein the first label is different than the second label.

15. A computer system comprising:

a computer having a processor for executing computer-executable instructions and a memory for maintaining the computer-executable instructions, the computer-executable instructions when executed by the processor of the computer perform the following functions:

receiving a training data set comprised of pairs of training input signals and corresponding output signals, the classifier parameterized by parameters and configured to classify input signals obtained from a sensor into at least two different classes including first and second classes, a class-dependent allowed perturbation for each of the at least two different classes and including a first class-dependent allowed perturbation for the first class and a second class-dependent allowed perturbation for the second class, and a loss function;

initializing a total loss and a stopping condition;

partitioning the training data set into a first subset labelled with a first label corresponding to the first class and a second subset labelled with a second label corresponding to the second class;

calculating a first loss in response to the first subset and the first class-dependent allowed perturbation and a second loss calculated in response to the second subset and the second class-dependent allowed perturbation;

updating the total loss in response to the first and second losses to obtain an updated total loss;

updating the stopping condition in response to the updated total loss to obtain an updated stopping condition;

iteratively performing the partitioning, calculating, updating the total loss, and updating the stopping condition steps within a class loop until the updated stopping condition is a stopping value different than a pre-determined value; and updating the parameters in response to the first and second losses to obtain updated parameters after the iteratively performing steps.

16. The computer system of claim 15, wherein the computer-executable instructions when executed by the processor of the computer perform the following further functions:

sending the input signals obtained from the sensor into the classifier parameterized by the updated parameters to obtain output signals configured to characterize a classification of the input signals; and transmitting an actuator control command to an actuator of a computer-controlled machine in response to the output signals.

17. The computer system of claim 15, wherein the updating function is carried out by a machine learning (ML) algorithm.

18. The computer system of claim 15, wherein the pre-determined value is one of first and second binary values.

19. The computer system of claim 18, wherein the pre-determined value is the first binary value and the stopping value is the second binary value.

20. The computer system of claim 15, wherein the first and second class-dependent allowed perturbations are dependent on a discriminator that is unable to distinguish perturbed data from unperturbed data.

* * * * *